(12) United States Patent
Bach (10) Patent No.: US 9,587,411 B2
(45) Date of Patent: Mar. 7, 2017

(54) TELESCOPIC MAST

(71) Applicant: FALCK SCHMIDT DEFENCE SYSTEMS, Odense C (DK)

(72) Inventor: Carsten Bach, Middelfart (DK)

(73) Assignee: FALCK SCHMIDT Defence Systems A/S, Odense C (DK)

( * ) Notice: Subject to any disclaimer, the term of this patent is extended or adjusted under 35 U.S.C. 154(b) by 0 days.

(21) Appl. No.: 14/426,545

(22) PCT Filed: Sep. 6, 2013

(86) PCT No.: PCT/DK2013/050285
§ 371 (c)(1),
(2) Date: Mar. 6, 2015

(87) PCT Pub. No.: WO2014/037014
PCT Pub. Date: Mar. 13, 2014

(65) Prior Publication Data
US 2015/0211250 A1    Jul. 30, 2015

(30) Foreign Application Priority Data

Sep. 6, 2012    (DK) .................................. 2012 70543

(51) Int. Cl.
*E04H 12/18*    (2006.01)
*F16M 11/28*    (2006.01)
(Continued)

(52) U.S. Cl.
CPC ............. *E04H 12/182* (2013.01); *F16B 2/18* (2013.01); *F16B 7/14* (2013.01); *F16M 11/28* (2013.01)

(58) Field of Classification Search
CPC . E04H 12/182; F16B 2/18; F16B 7/14; F16M 11/28
(Continued)

(56) References Cited

U.S. PATENT DOCUMENTS 3,776,500 A    12/1973    Foderaro
3,887,155 A    6/1975    Bertalot
(Continued)

FOREIGN PATENT DOCUMENTS

DE    38 15 852 A1    11/1989
DE    44 38 815 A1    6/1996
(Continued)

*Primary Examiner* — Brian Glessner
*Assistant Examiner* — Omar Hijaz
(74) *Attorney, Agent, or Firm* — David S. Safran (57) ABSTRACT

A telescopic mast has a plurality of telescopic sections with longitudinally extending walls, a transverse dimension of the innermost telescopic section being smaller than the outermost telescopic section of two adjacent telescopic sections, so that the innermost telescopic section can slide longitudinally in and out of the outermost of two adjacent telescopic sections. A restrictor is provided between the two adjacent telescopic sections, the restrictor having a longitudinally extending linear guide provided on one of two adjacent telescopic sections and a clamping device provided on the other one of two adjacent telescopic sections, wherein the clamping device is configured for providing a clamping force to the guide during relative movement of said two adjacent telescopic sections, wherein the clamping force has two oppositely directed rotational force components in a plane normal to the longitudinal direction of the mast and perpendicular to the radius of the mast through the guide.

11 Claims, 11 Drawing Sheets

(51) Int. Cl.
*F16B 2/18* (2006.01)
*F16B 7/14* (2006.01)

(58) Field of Classification Search
USPC ............ 52/2.21, 40, 651.01, 651.02, 651.03, 52/651.04, 651.05, 651.07, 651.08, 52/651.09, 655.1
See application file for complete search history.

(56) References Cited

U.S. PATENT DOCUMENTS

| | | | |
|---|---|---|---|
| 4,638,563 A * | 1/1987 | Buniff | G01B 3/08 33/833 |
| 8,549,812 B1 * | 10/2013 | Peng | E04B 1/34305 212/348 |
| 8,695,286 B2 | 4/2014 | Falck-Schmidt | |
| 2010/0050557 A1 * | 3/2010 | Falck-Schmidt | H01Q 1/1235 52/632 |
| 2015/0322687 A1 * | 11/2015 | Pereira | E04H 12/182 52/849 |

FOREIGN PATENT DOCUMENTS

| | | |
|---|---|---|
| DE | 100 19 576 A1 | 10/2001 |
| EP | 0 277 078 A1 | 8/1988 |
| FR | 2 640 607 A1 | 6/1990 |
| FR | 2 642 059 A1 | 7/1990 |
| FR | 2 713 619 A1 | 6/1995 |
| GB | 2 045 309 A | 10/1980 |
| GB | 2 134 072 A | 8/1984 |
| GB | 2 179 022 A | 9/1987 |
| WO | 2008/028490 A1 | 3/2008 |

\* cited by examiner

TELESCOPIC MAST

BACKGROUND OF THE INVENTION

Field of the Invention

The present invention relates to a telescopic mast comprising a plurality of telescopic sections each with walls extending in the longitudinal direction of the mast, where the transverse dimension of the innermost telescopic section is smaller than the outermost telescopic section of two adjacent telescopic sections, so that the innermost telescopic section can slide longitudinally in and out of the outermost telescopic section of two adjacent telescopic sections wherein a restrictor is provided between two adjacent telescopic sections, the restrictor comprising a longitudinally extending linear guide means provided on one of two adjacent telescopic sections and a clamping means provided on the other one of two adjacent telescopic sections, wherein the clamping means is configured for providing a clamping force to the guide means during relative movement of said two adjacent telescopic sections, wherein the clamping force include two opposite directed rotation force components in a plane normal to the longitudinal direction of the mast and perpendicular to the radius of the mast through the guide means.

Furthermore the present invention relates to a restrictor for a telescopic mast.

Description of Related Art

Telescopic masts have been employed in various applications. The mast comprises a plurality of sections that decrease in size, such that the sections can be arranged coaxially inside each other.

The telescopic mast can be extended in its longitudinal direction from a collapsed state to an extended state. In the collapsed state the length of the mast corresponds to that of the longest section. Most commonly the sections have the same length. In its extended state the sections become narrower from its base towards the head of the mast. The height of the mast in its extended state is less than the sum of the length of the sections, because each section overlaps to provide stability and resistance to bending forces and wind forces on the mast.

The head provides a platform for various types of equipment, for example, surveillance equipment, reconnaissance equipment, target tracking equipment or communication equipment. Such equipment may for example, comprise cameras, sensors or aerials.

A special problem of telescopic masts is that of play due to tolerances between adjacent sections. As play occurs between all adjacent sections the play will accumulate from the base of the mast to the head and thus the platform. This is especially pronounced with tall masts comprising many sections. Play between the sections will allow relative movement of the platform in relation to the base of the mast.

The term "play" in the present application is defined as an unintended sudden and unpredictable movement of one section relative to another section.

In mobile applications, for example, on a vehicle, the mast is subject to accelerations in various directions as the vehicle moves. These accelerations will force the platform to move in relation to the base due to the play between the sections. When the vehicle is stationary, the play may still be a factor because as the sensors move they apply a force to the mast due to inertia.

An angular play of the mast in rotation of a very small magnitude results in very large inaccuracies at a distance of several kilometers. Such inaccuracy is unacceptable for the above mentioned types of equipment and especially for target tracking equipment.

Bending of the mast also gives rise to play in the form of relative movement of the platform in relation to the base of the mast and as a consequence an unacceptable inaccuracy in the vertical direction at the distances at which the equipment is required to point at and follow an object.

In mobile systems, advanced cameras and sensors equipped with gyros are able to compensate for the movements of the platform as the vehicle moves along a rough or inclined surface. The movements of the platform due to the vehicle movements are relatively slow and gradual. However, the movements of the platform due to play are sudden and, as the sections reach the limit of movement, gives rise to an impact in a given direction. The impact cause an acceleration spike that is applied to the equipment through the platform. Such acceleration spikes are very difficult to compensate for and therefore the sensor systems may fail to provide the required capability.

Systems to minimize or eliminate play have therefore been proposed in the past to solve this problem.

German Application DE 10019576 A1 describes a telescopic device with telescoping tubes. On a guide element a number of rollers are provided, for applying a set force to the tubes perpendicular to the direction of movement of the telescoping tubes. The purpose of the rollers is to minimize play of the telescoping tubes. This device is not suited for applications where the components are subject to dust and sand particles because accompanying wear of the rollers and tube surfaces will reduce the force applied by the rollers.

In International Patent Application publication WO 2008/028490 A1 and corresponding, commonly owned U.S. Pat. No. 8,695,286, an example of such a system has been proposed. A telescopic mast is disclosed with a system to minimize play between the telescoping sections. Although successfully employed this system is complex.

SUMMARY OF THE INVENTION

An object of the present invention is to provide a telescopic mast that has a simple system that enables satisfactory operation of sensor systems on the mast.

According to the present invention, this is achieved by a telescopic mast of the type specified in the introduction and which is peculiar in that, the restrictor comprises a control means, and that the control means is configured for controlling the clamping force.

Furthermore, according to the present invention, this is achieved by a restrictor which comprises a longitudinally extending linear guide means provided on one of two adjacent telescopic sections and a clamping means provided on the other one of two adjacent telescopic sections, wherein the clamping means is configured for providing a clamping force to the guide means during relative movement of said two adjacent telescopic sections, and wherein the clamping force include two opposite directed rotation force components in a plane normal to the longitudinal direction of the mast and perpendicular to the radius of the mast through the guide means which restrictor is peculiar in that the restrictor comprises a control means, and that the control means is configured for controlling the clamping force.

It is herewith achieved that a simple system is provided that enables satisfactory operation of sensor systems on the mast. The restrictor alleviates the adverse effect of play between the telescopic sections by reducing the speed at which the sections move in relation to each other and thereby eliminating play. The relative movement between the sections becomes predictable and relatively slow. As the limit of relative movement between the sections due to tolerances is met by the structure of the telescopic sections the impact is slight and therefore the sensors are able to compensate as the acceleration spike will be negligible. The sensors are therefore able to perform as required when installed on the telescopic mast even during movement of the mast.

In the above embodiment, the restrictor is continuously in operation. The clamping force will produce a friction force between the guide means and the clamping means during relative movement of the two adjacent sections. Therefore, the means for extending and retracting the mast must be able to overcome the friction force.

The advantage of having the restrictor in continuous operation is that it will operate from the moment that extension of the mast is initiated from its fully retracted position. The system will operate in all positions between the fully retracted and fully extended position. This provides flexibility of operation, because the mast can be operated at different heights.

The guide means may be mounted to the outermost telescopic section and the clamping means to the innermost telescopic section. Alternatively, the guide means is mounted to the innermost telescopic section and the clamping means is mounted to the outermost telescopic section.

The clamping means is located opposite the guide means, such that the clamping means may engage and slide along the guide means, while applying a clamping force onto the guide means.

The clamping force is applied to the guide means such that two opposite directed rotation force components are applied to the guide means in a plane normal to the longitudinal direction of the mast and tangent to the radius of the mast. The rotation force components are equal in magnitude. This will prevent relative rotation of two adjacent telescopic sections and control relative movement between the adjacent telescopic sections in the longitudinal direction of the mast.

Moreover, it is achieved that the clamping force can be controlled according to the operational requirements of the mast. As the restrictor necessitates more power to extend and/or retract the mast compared to prior art systems without the resistor, it is an advantage to be able to selectively apply a clamping force of a higher magnitude when operating in an off-road condition and a lower clamping force when operating in on-road conditions.

In one embodiment of the invention, the control means is a spring biasing means, for providing a spring biased clamping force.

It is herewith achieved that the clamping force applied is less dependent on wear of the clamping means and wear of the guide means.

The term "radius" in the present application is referring to a line segment extending from the center of the mast towards its perimeter in a plane normal to the longitudinal direction of the mast and such that the line segment extends through the guide means. A radius may be defined for any point along the longitudinal direction of the mast.

It is herewith achieved that rotational play is eliminated in addition play in the longitudinal direction due to the controlling of the speed of the relative movement between the sections in the longitudinal direction.

The mast may have a shape that is circular, oval, triangular, quadrilateral, pentagonal, hexagonal, heptagonal, octagonal, enneagonal, decagonal, hendecagonal, dodecagonal or other polygonal shape or a combination hereof.

In an embodiment, the telescopic mast is installed on a vehicle.

It is herewith achieved that the telescopic mast is provided with mobility.

In an embodiment, the telescopic mast is installed on a military vehicle.

When operating on a military vehicle the environmental conditions are much more severe than in civil applications. Therefore the requirements to the components of the system are much higher. Examples of such requirements are; temperature—the conditions may vary from very extreme cold conditions to very extreme warm conditions, vibrations—the vibration spectrum is severe due to off road operations and air, sea and land transportation, humidity—the humidity conditions will vary from extreme dryness to extreme humid due to worldwide operations, dust—the telescopic mast is required to operate in severe dusty environments, i.e., in deserts. Moreover the reliability requirements are more severe than in civil applications and severe weight restrictions may apply.

In order to meet the environmental requirements, the operational readiness, reliability and weight requirements of military equipment it is necessary to apply special considerations during the design of the equipment, since conventional design conventions may not sufficiently meet all requirements.

According to a further embodiment, the telescopic mast according to the invention is peculiar in that the control means comprise a passive actuator for controlling the clamping force, or an active actuator for controlling the clamping force.

The control means may comprise a passive actuator for controlling the clamping force, where the clamping force is adjusted manually between missions or an active actuator for controlling the clamping force, where the clamping force may be adjusted during a mission.

An example of a passive actuator may be a mechanical spring or a gas-spring.

An example of an active actuator may be a hydraulic, electrical or pneumatically driven actuator.

According to a further embodiment, the telescopic mast according to the invention is peculiar in that, the clamping means is configured for providing a clamping force to the guide means with a centering force component parallel with the direction of the radius of the mast through the guide means.

It is herewith achieved that the clamping means will reduce the play between the sections caused by tolerances between the radiuses of the inside of the outermost telescopic section and the outside of the innermost telescopic section.

In a preferred embodiment, the telescopic mast according to the invention, is peculiar in that it comprises three or more restrictors, wherein the restrictors are evenly distributed about the perimeter of the telescopic sections.

This embodiment may be advantageously combined with the embodiment providing a clamping force to the guide means with a centering force component. This embodiment is especially advantageous because it provides centering of the sections.

This is especially true if the centering force components are of equal magnitude.

According to a further embodiment, the telescopic mast according to the invention is peculiar in that, the control means comprises a switching means, wherein the switching means is configured for selectively clutching/declutching the clamping means.

It is herewith achieved that clamping force may be selectively applied to the guide means.

For example, the clamping means may be declutched during extension and retraction of the mast, and clutched when extension or retraction is interrupted and/or when the sensors on the platform are in operation.

Combined with the embodiment wherein the control means is a passive actuator the switching means may be an active actuation device, for example, a hydraulic, electrical or pneumatically driven actuator. The switching means is coupled in parallel with the passive actuator, so that it may override the passive actuator when declutching the clamping means.

Combined with the embodiment wherein the control means is an active actuator the switching means may be integrated with the control means for the active actuator. For example, where the control means comprises an electrical circuit for controlling the active actuator the switching means may be integrated with this circuit. In this case the switching means is coupled in parallel with the control means in the electrical circuit.

Declutching is performed by moving the clamping means to a position where the clamping force is interrupted.

Clutching is performed by moving the clamping means from the declutched position to a clutched position, where the clamping means is in contact with the guide means for applying a clamping force.

According to a further embodiment, the telescopic mast according to the invention is peculiar in that, the guide means is a guide bar and that the clamping means comprise at least two sliding shoes, wherein the guide bar has at least two longitudinally extending abutment surfaces configured for receiving the clamping force, and wherein each sliding shoe has a complimentary slide surface adapted for transferring the clamping force to one of said abutment surfaces.

It is herewith achieved that the clamping means and guide means can be applied in a simple manner of little complexity.

The guide bar may have a circular, rounded, triangular-, square-, rectangular-, trapezoidal, polygonal-cross-sectional shape or a combination thereof. At least one abutment surface is provided on each side of the guide bar. The abutment surface is shaped and angled such that it is able to take up the clamping forces applied by the sliding shoes. For example, the abutment surface may be perpendicular to the direction of the rotation force components. The guide bar may include groves or dovetails to increase the abutment surface area to allow for the application of a clamping force of a high magnitude and in different directions.

The at least two sliding shoes are positioned in an opposing relationship such that the clamping force including the two opposite directed rotation force components can be transferred to the abutment surfaces of the guide bar.

According to a further embodiment, the telescopic mast according to the invention is peculiar in that, the clamping means comprises a pivot arm, wherein the pivot arm is pivotable about the radius of the mast through the guide means, wherein a sliding shoe is pivotably connected to the pivot arm on each side of the guide bar.

It is herewith achieved that the clamping force may be provided by rotating the pivot arm. The slide surface of the sliding shoes will contact the abutment surface on either side of the guide means.

In a mast having a symmetrical guide means, the pivot arm will pivot about an axis intersecting a plane of symmetry parallel with the radius of the mast through the guide means. If the distance between the axis of rotation of the pivot arm and the sliding surface of the sliding shoes are equal for each sliding shoe, the clamping force applied to the guide means by the two sliding shoes will be equal in magnitude and opposite directed.

The clamping force components applied by the two sliding shoes will offset along the longitudinal direction of the mast. This will apply a torque to the guide means that will try to rotate the guide means in relation to the clamping means. Therefore the clamping means must comprise a passive support at a distance from the sliding shoes to prevent rotation.

According to a further embodiment, the telescopic mast according to the invention is peculiar in that, the clamping means comprises at least two pivot arms.

It is herewith achieved that the torque induced by the offset sliding shoes can be counteracted. The two pivot arms are arranged such that the pivot arms are rotated in opposite directions. The two pivot arms will apply opposite directed torque. The various elements of the restrictor is sized such that the torque applied by the sliding shoes of each pivot arm is or equal magnitude. The resulting torque is equal to 0.

According to a further embodiment, the telescopic mast according to the invention is peculiar in that, the control means is an actuator, wherein the actuator is in communication with the pivot arms, such that the pivot arms rotate in opposite directions upon activation of the actuator.

It is herewith achieved that the control means can apply a controlled clamping force about the radius of the mast through the guide means.

In an embodiment, the control means is a rotary actuator.

According to a further embodiment, the telescopic mast according to the invention is peculiar in that, the control means is a linear actuator, and that the actuator is connected between the pivot arms.

It is herewith achieved that the control means can apply an equal and controlled clamping force with no torque about the radius of the mast through the guide means. When the sliding shoes and the two pivot arms a balanced, the force applied by the linear actuator will be divided equally between each pivot arm.

The linear actuator may be a tension spring. The tension spring will provide a constant force to the pivot arms without external power supply. Furthermore the spring provides the advantage that the clamping force remains substantially constant even as the sliding shoes and guide means are worn. The performance of the restrictor therefore does not degrade significantly due to wear. The time between repairs may therefore be high.

The invention will be explained in more detail below with reference to the accompanying drawings.

DETAILED DESCRIPTION OF THE INVENTION

In the explanation of the figures, identical or corresponding elements will be provided with the same designations in different figures. Therefore, no explanation of all details will be given in connection with each single figure/embodiment.

Figure 1:
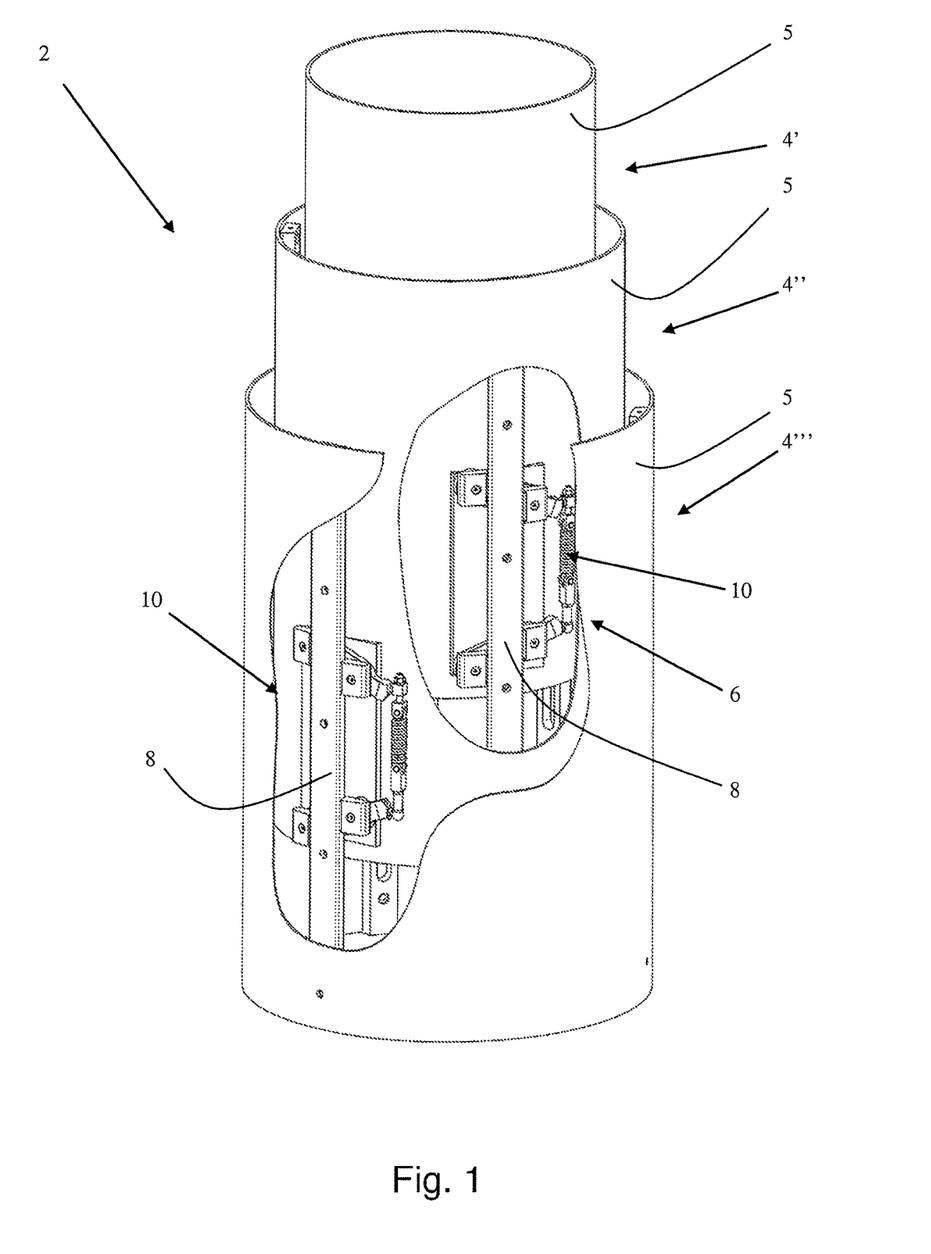
FIG. 1 shows a telescopic mast according to the invention.

FIG. 1 shows an illustration of a telescopic mast 2. A telescopic mast in the embodiment shown comprises three telescopic sections 4', 4", 4'''.

Each telescopic section 4', 4", 4''' has a wall 5 extending in the longitudinal direction of the mast 2. The innermost telescopic section 4' has a transverse dimension that is smaller than the adjacent telescopic section denoted 4" which in turn has a smaller transverse dimension than the outermost telescopic section denoted 4'''.

The innermost telescopic section 4' is able to move in and out of its adjacent section denoted 4". The telescopic section denoted 4" together with the innermost telescopic section 4' is able to move into and out of the outermost telescopic section 4'''.

The telescopic mast 2 is movable between a collapsed position and an extended position. The telescopic mast 2 is able to stop in any intermediate position between the collapsed and extended position.

The telescopic mast 2 may carry a sensor platform (not shown) on the innermost telescopic section 4'. The sensor platform (not shown) may have a variety of sensors (not shown) installed onto it, depending on the type of mission. A restrictor 6 is provided between adjacent telescopic section 4', 4" and adjacent telescopic sections 4", 4'''.

In the embodiment shown, three restrictors 6 are provided between each two adjacent telescopic sections.

The restrictor 6 comprises a longitudinally extending linear guide means 8 and a clamping means 10. In the embodiment shown in FIG. 1, guide means 8 are attached on the inside of the wall 5 of the outermost telescopic sections denoted 4", 4''', respectively. The clamping means 10 are attached to the outside of the wall 5 of the innermost telescopic sections denoted 4', 4", respectively, The restrictors 6 are configured for controlling relative movement in the longitudinal direction as well as in relative movement in rotation between the telescopic sections 4', 4", 4' during extension, retraction as well as when the telescopic mast is stopped in any position.

Figure 2:
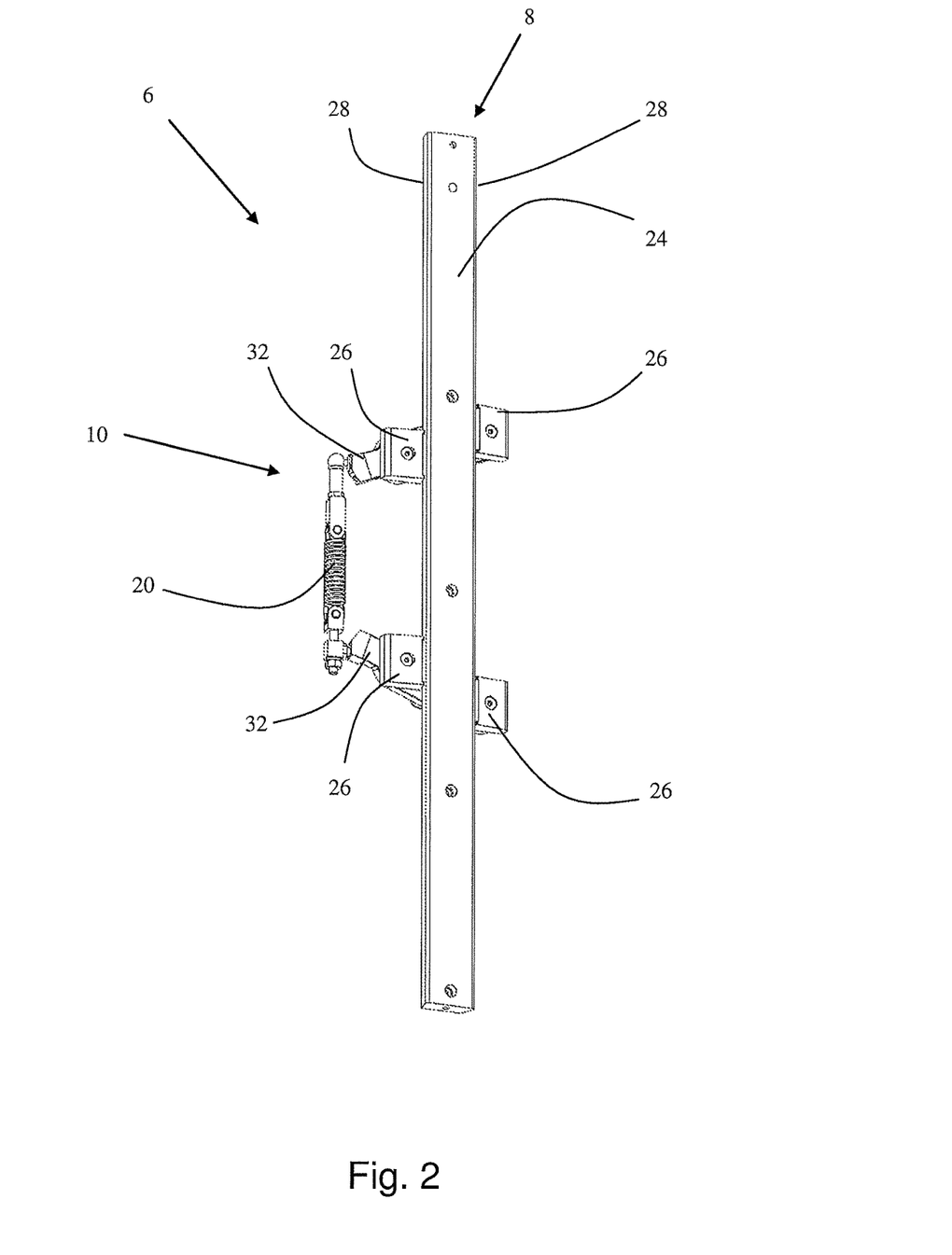
FIG. 2 shows a first view of an embodiment of a restrictor according to the invention.
Figure 3:
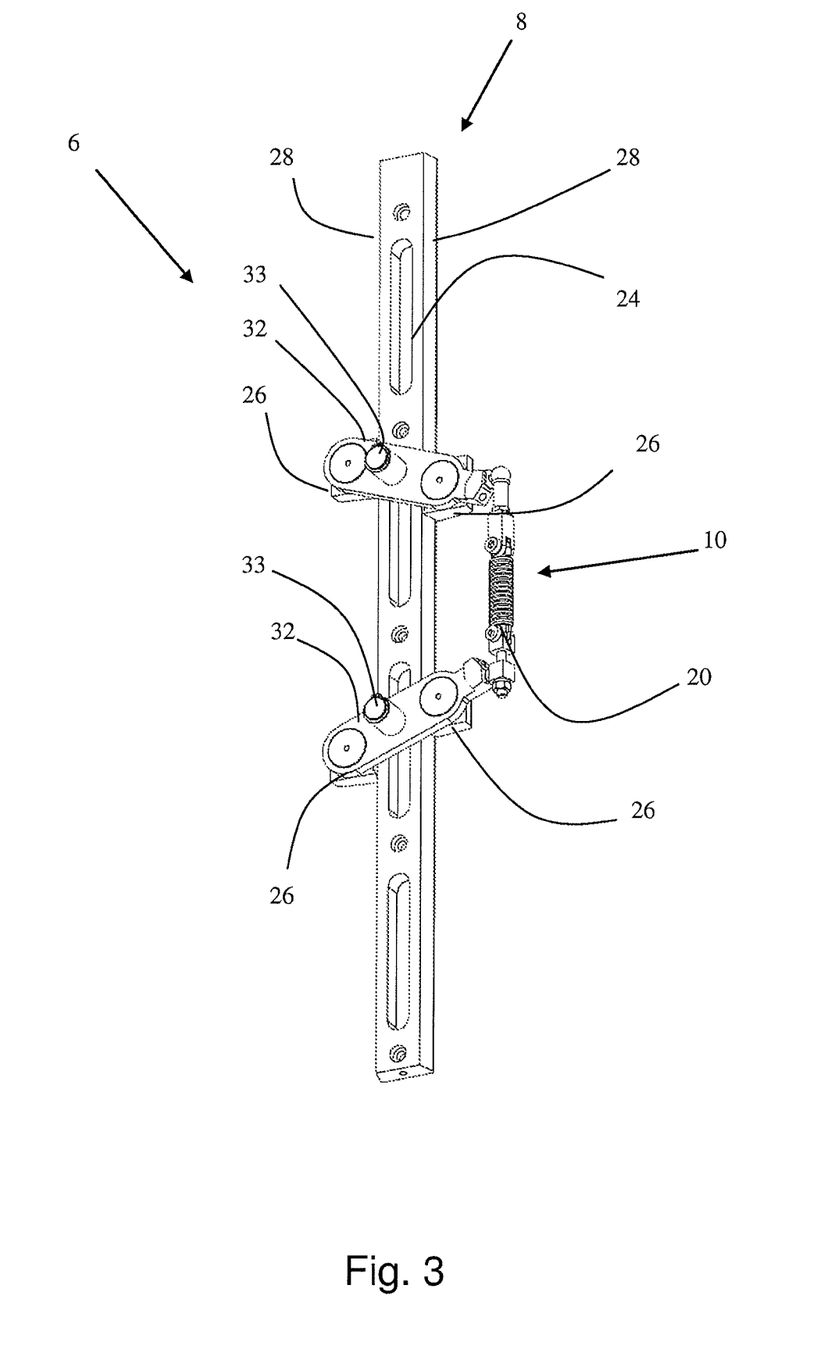
FIG. 3 shows a second view of the restrictor according to FIG. 2.

FIGS. 2 & 3 illustrate an embodiment of a restrictor 6 according to the invention.

The restrictor comprises a longitudinal extending linear guide means 8 and a clamping means 10. The guide means 8 is a guide bar 24. The guide bar 24 has two longitudinally extending abutment surfaces 28.

The clamping means 10 comprise four sliding shoes 26. The sliding shoes 26 have a slide surface 30 that is complimentary to the abutment surface 28 of the guide bar 24. The slide surface 30 of each sliding shoe 26 is adapted for transferring a clamping force 12 to one of the abutment surfaces 28, and the abutment surfaces are configured for receiving said clamping force 12 (see, FIG. 5).

The clamping means 10 comprises two pivot arms 32. Each pivot arm is attached to a pivot 33 about which each pivot arm 32 is able to pivot. The pivot 33 is attached to the wall 5 of a telescopic section (see, FIG. 1). A sliding shoe 26 is connected at each end of the pivot arm 32. The pivot arm 32 and the pivot 33 are aligned so that a sliding shoe 32 is located on each side of the guide bar 24. The restrictor 6 comprises a control means 20. When in use, the sliding shoes 26 are in contact with the guide bar 24. The control means 20 apply a clamping force to the guide bar through the sliding shoes 26.

In the embodiment shown in FIGS. 2 & 3, the control means 20 is a spring. The control means 20 is attached to one end of each pivot arm 32. The clamping force 12 may be increased by decreasing the length of the control means 20 or decreased by increasing the length of the control means 20. This can be done by tightening or relaxing the spring.

Figure 4:
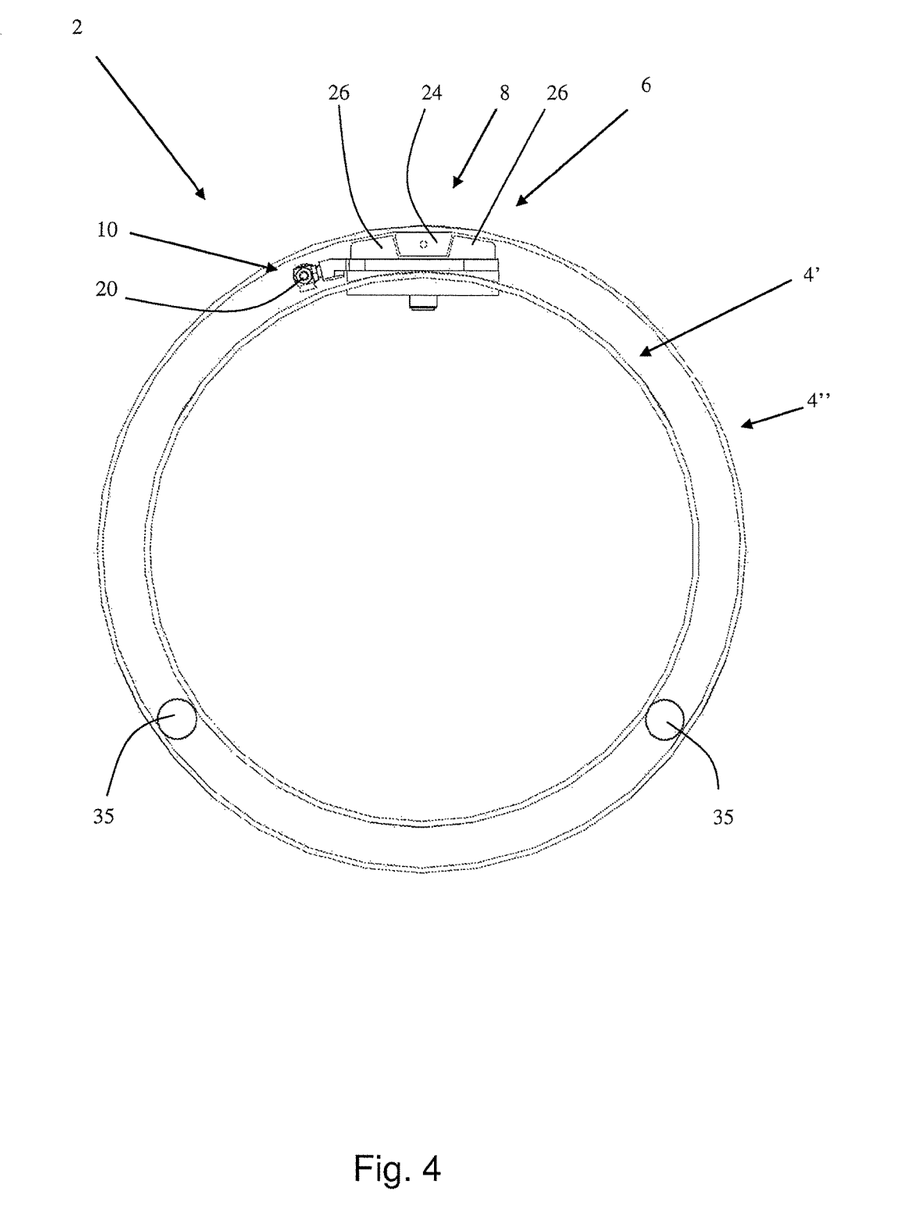
FIG. 4 shows a cross section of an embodiment of the telescopic mast having two telescopic sections and one restrictor.

FIG. 4 shows a cross section of an embodiment of the telescopic mast 2 having two telescopic sections 4', 4" and one restrictor 6.

The restrictor 6 is located in the interspace between the two telescopic sections denoted 4', 4". Two spacers 35 are located in the interspace as well. These spacers 35 together with the restrictor 6 ensure the correct centering of the telescopic sections 4', 4" in relation to each other.

Figure 5:
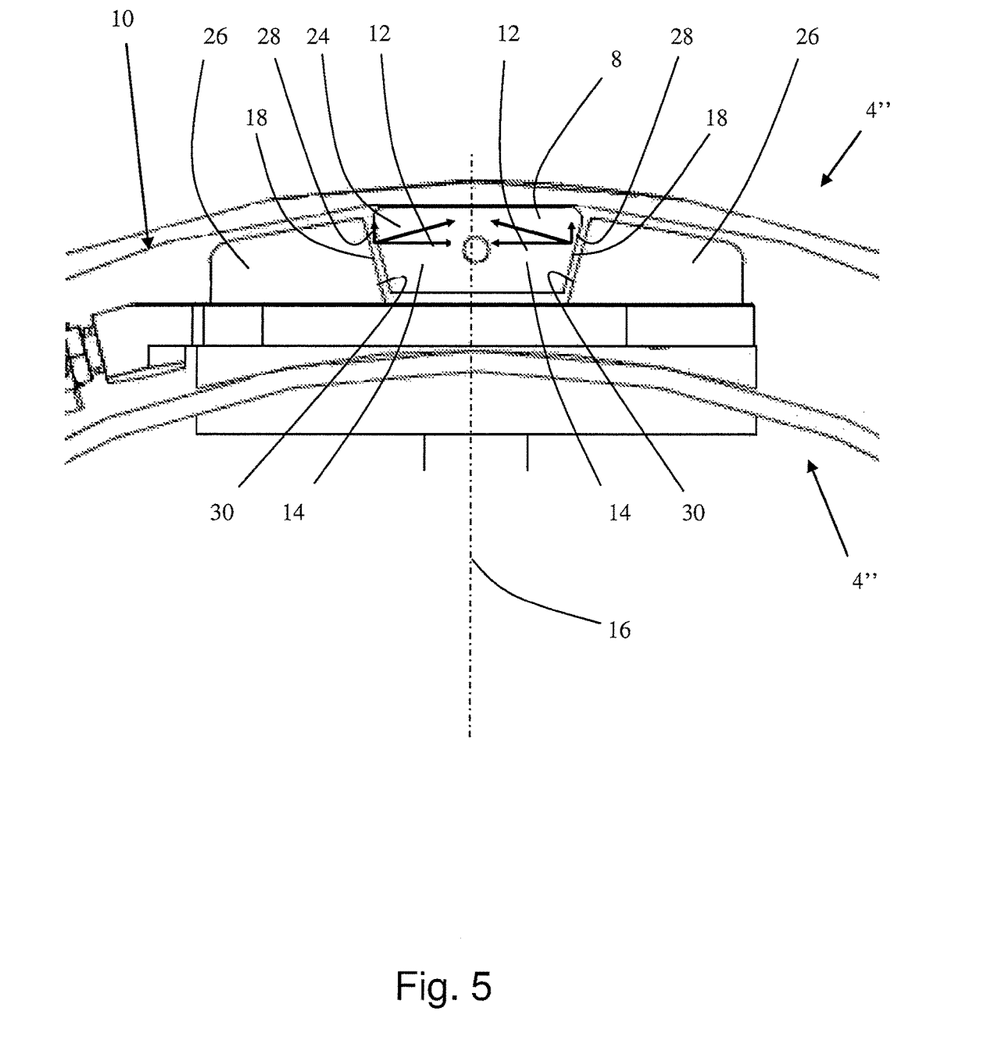
FIG. 5 shows a detail of the cross section of FIG. 4.

FIG. 5 shows a detail of the cross section of FIG. 4.

The clamping means 10 in this embodiment is formed by sliding shoes 26 on each side of the guide bar 24 and which provide a clamping force 12 to the guide means 8 by contact with the guide bar 24. The clamping force 12 has a direction normal to the surface of each sliding shoe 26. The clamping force 12 includes two oppositely directed rotation force components 14 in a plane normal to the longitudinal direction of the mast and perpendicular to the radius 16 of the mast 2 through the guide means 8. The rotation force components 14 are of equal magnitude and cancel out each other, because they are oppositely directed. It is herewith achieved that relative rotation of the telescopic sections 4', 4" is prohibited.

The clamping force 12 provides an additional friction force with a direction out of the plane. The friction force enables control of the relative movement between the telescopic sections 4', 4" in the longitudinal direction of the mast 2.

In the embodiment shown in FIG. 5, the surface of the sliding shoes 26 is angled in relation to the radius 16. Therefore, the clamping force 12 has a centering force component 18 that is parallel with the direction of the radius 16 of the mast 2 through the guide means 8. As a result, play in the direction of the radius is eliminated.

Figure 6:
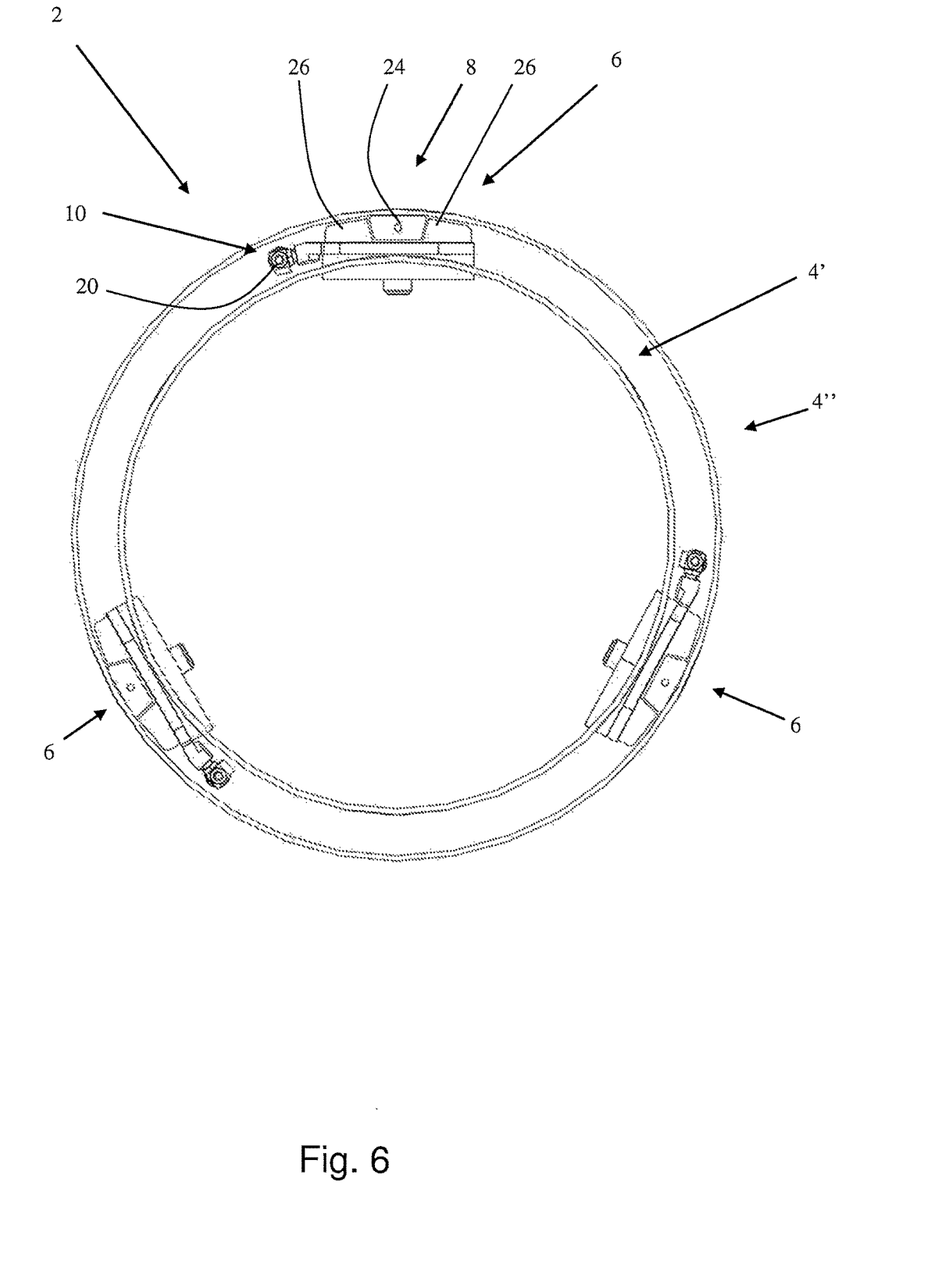
FIG. 6 shows a cross section of a telescopic mast having two telescopic sections and three restrictors.

FIG. 6 shows a cross section of a telescopic mast 2 having two telescopic sections 4', 4" and three restrictors 6.

The restrictors 6 are located in the interspace between the telescopic sections 4', 4" and are distributed evenly with a spacing of approximately 120 degrees.

This embodiment enhances the play elimination and provides good centering capabilities of the telescopic sections 4', 4" in relation to each other.

Figure 7:
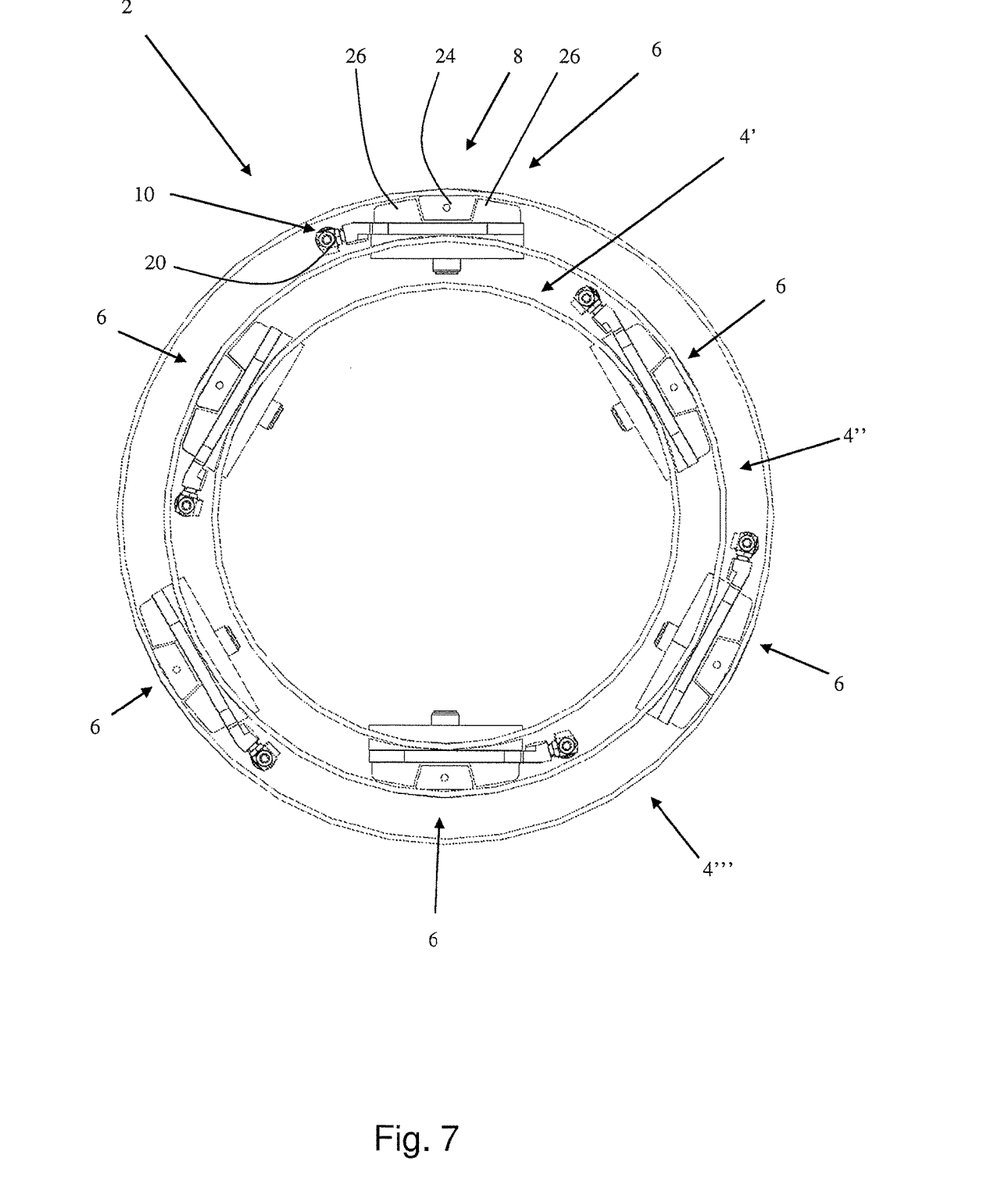
FIG. 7 shows a cross section of the telescopic mast of FIG. 1.

FIG. 7 shows a cross section of the telescopic mast 2 of FIG. 1.

In the interspace between the telescopic sections denoted 4', 4" there are located three restrictors 6. The restrictors 6 are evenly distributed within the interspace within angular distance of approximately 120 degrees.

In the interspace between the telescopic sections denoted 4", 4' there are located three restrictors 6. The restrictors 6 are evenly distributed in this interspace with an angular distance of approximately 120 degrees. The restrictors 6 in the innermost interspace between the telescopic sections denoted 4', 4" are offset from the restrictors 6 in the outermost interspace between the telescopic sections denoted 4", 4''' by approximately 60 degrees.

Figure 8:
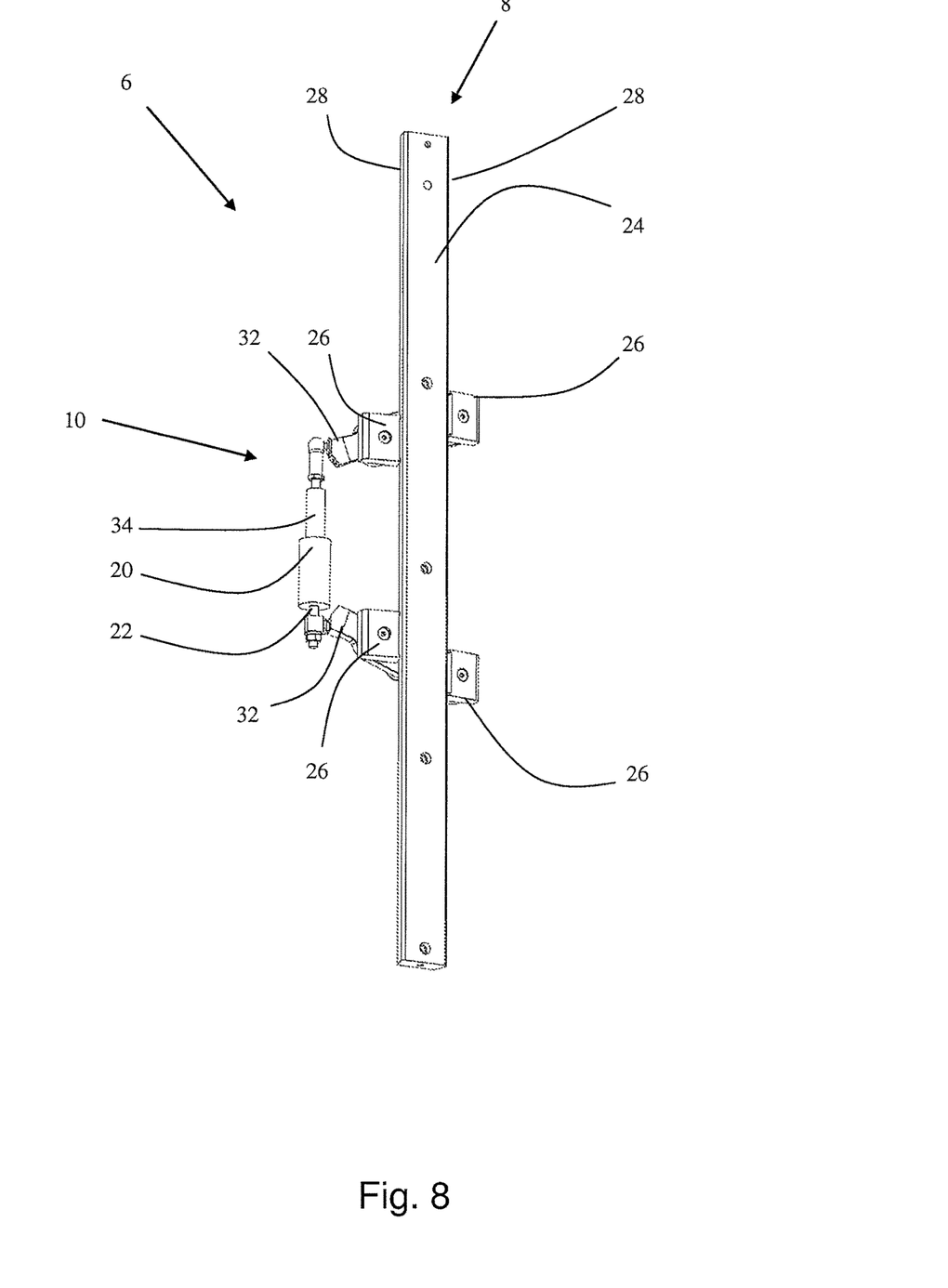
FIG. 8 shows a view of a restrictor having an actuator as a control means.

FIG. 8 shows a view of a restrictor 6 having an actuator 34 as a control means 20.

The actuator 34 is connected between the pivot arms 32 so that the pivot arms 32 rotate in opposite directions upon activation of the actuator 34.

When the actuator is extended, the clamping force 12 is reduced. When the actuator 34 is retracted, the clamping force 12 is increased.

In the embodiment in FIG. 8, the actuator 34 is a linear actuator.

Figure 9:
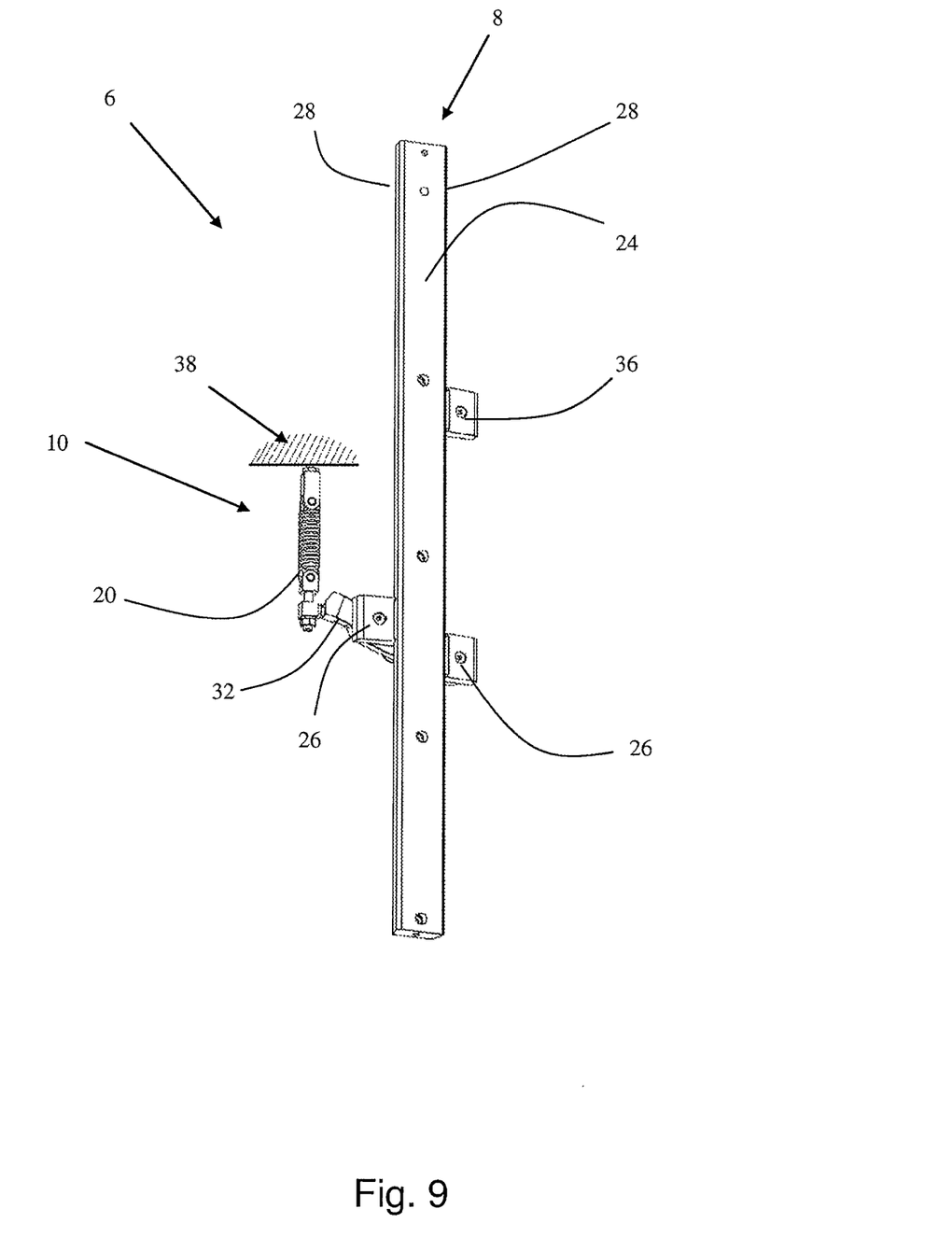
FIG. 9 shows a view of a an embodiment of the restrictor having one pivot arm and a passive support.

FIG. 9 shows a view of an embodiment of the restrictor 6 having one pivot arm 32 and a passive support 36.

The clamping means 10 that comprises control means 20 is in the form of a spring that is connected between the pivot arm 32 and a fixed point 38.

The pivot arm applies the clamping force 12 through sliding shoes 26 to the abutment surfaces 28 of the guide bar 24.

The sliding shoes 26 are vertically offset. Therefore, they apply a torque to the guide bar 24. This torque is counteracted by a passive support 36. The passive support 36 has a sliding surface that is complementary to the abutment surface 28 of the guide bar 24.

Figure 10:
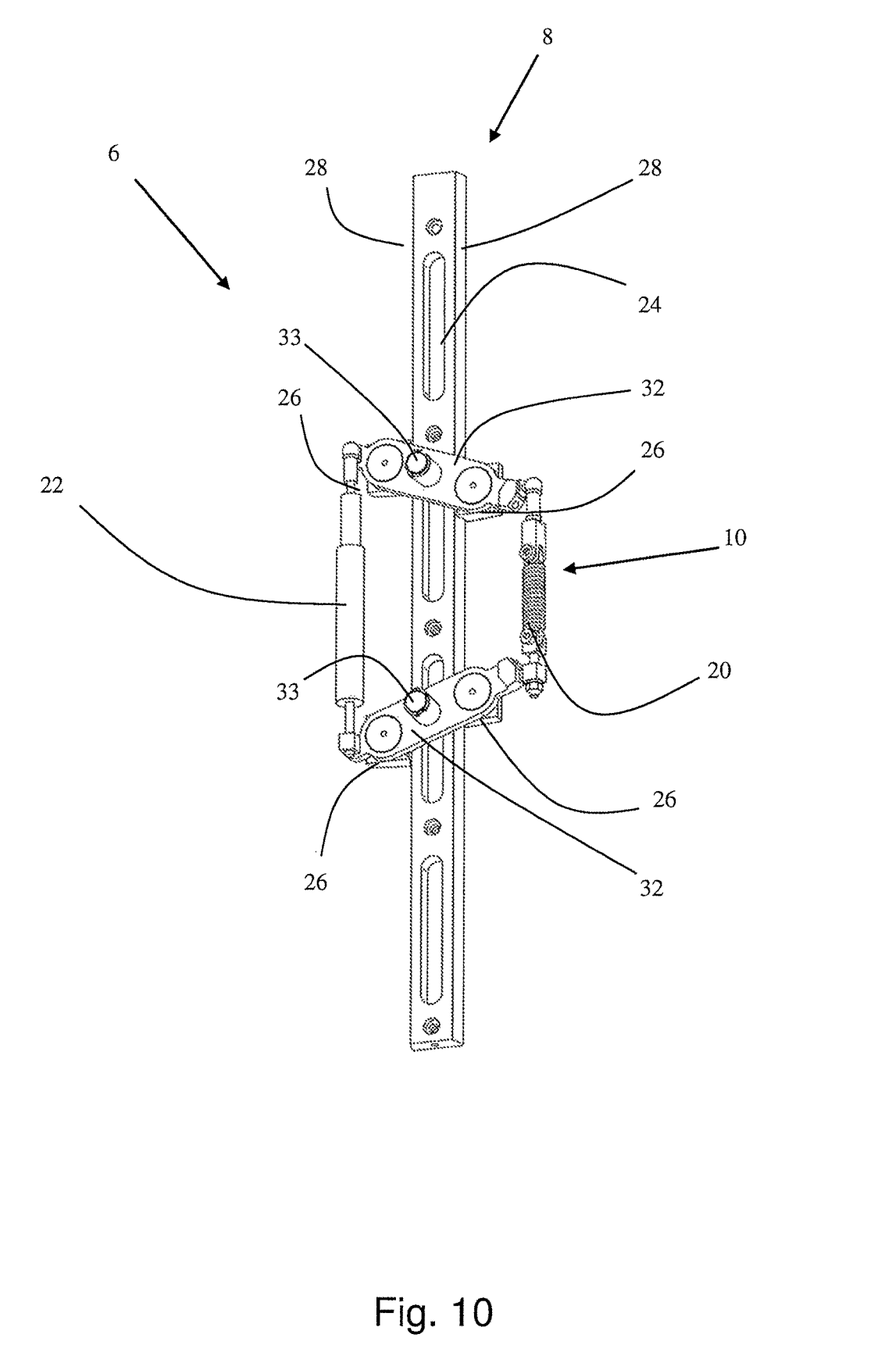
FIG. 10 shows a view of an embodiment of the restrictor having a switching means.

FIG. 10 shows a view of an embodiment of the restrictor 6 having a switching means 22.

This embodiment differs from the embodiment shown in FIGS. 2 & 3 in that the switching means 22 is connected between the ends of the pivot arms 32 opposite the control means 20. The switching means 22 is an actuator that is configured for selectively clutching/declutching the clamping means 10.

When the actuator of the switching means 22 is retracted, the control means 20 is forced to extend. This will lower the clamping force 12 until it has a magnitude of zero. When the magnitude of the control force 12 is zero, then the clamping means 10 is completely declutched. When the actuator is subsequently extended, the control means 20 will gradually take over control of the pivot arms 32. When the actuator of the switching means 22 is completely extended and external forces through the actuator are interrupted, the clamping means 10 is completely clutched.

When the telescopic mast 2 is extending or retracting, the switching means 22 may declutch the clamping means 10. This will remove friction between the sliding shoes 26 and the guide bar 24. When the clamping means 10 is declutched, the restrictor 6 is inoperable and will not prevent play. The power consumption during extending or retraction of the mast 2 in this embodiment is less than in embodiments without this capability.

Alternatively, if the control means 20 has failed, the switching means 22 may take over the operation of the control means 20. This adds redundancy to the restrictor 6.

FIGS. 11a-d show examples of other cross sections that can be used for the guide means 8 and the clamping means 10.

Figure 11A:
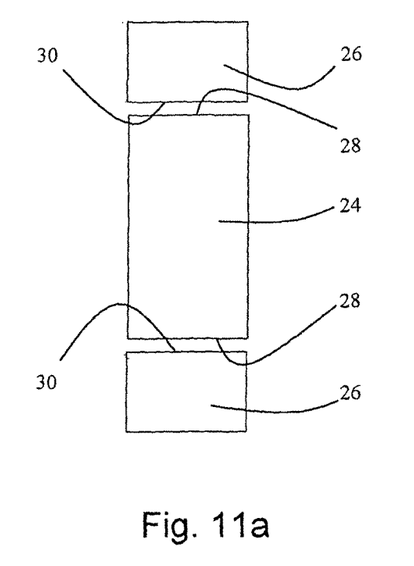
FIG. 11a-d show examples of cross sections of the guide means and the clamping means.

The embodiment in FIG. 11a has abutment surfaces 28 and slide surfaces 30 that are parallel to the radius 16. Therefore, this embodiment is capable of prohibiting relative rotation of the telescopic sections. The embodiment is not capable of centering the telescoping sections.

Figure 11B:
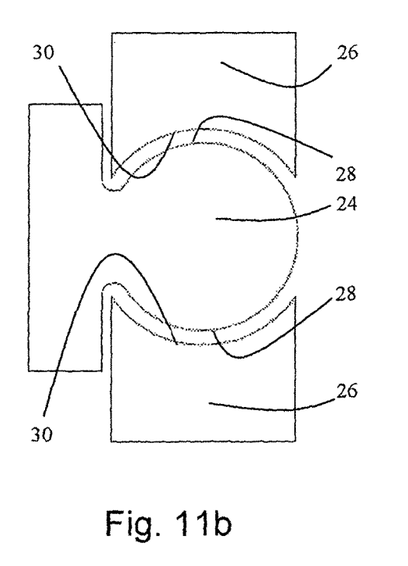

The embodiment in FIG. 11b has a curved abutment surface 28 and a curved slide surface 30. This embodiment provides a relatively larger contact area between the sliding shoes 26 and the guide bar 24. Therefore, it is possible to provide a larger friction force than in the previous embodiment. Moreover, in this embodiment, a single guide means 8 and clamping means 10 will enable centering of the telescopic sections in relation to each other.

Figure 11C:
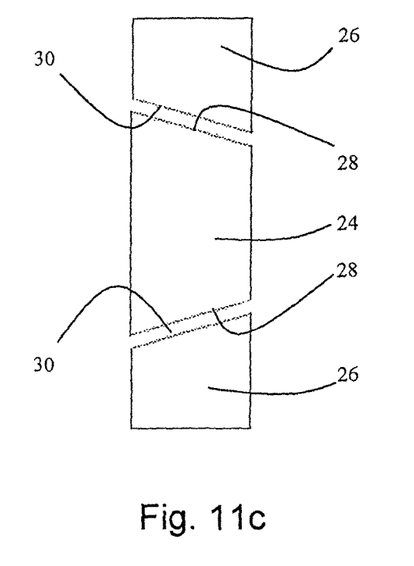

The embodiment in FIG. 11c has abutment surfaces 26 and slide surfaces 30 that are slanted in relation to the radius 16. This embodiment enables centering of the telescopic sections in relation to each other. Provided that additional guide means 8 and clamping means 10 are distributed around the perimeter of the telescopic sections (see, FIGS. 1, 6 and 7) or that spacers 35 are distributed around the perimeter of the telescopic sections (see, FIG. 4).

Figure 11D:
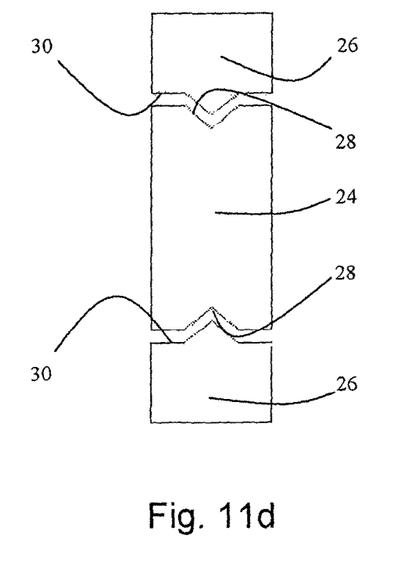

The embodiment in FIG. 11d provides an abutment surface 28 having a groove and a slide surface having a protrusion that is complementary to the groove. This embodiment also enables centering of the telescopic sections in relation to each other. Furthermore, this embodiment does not require the use of spacers 35 (see, FIG. 4) to enable centering of the telescopic sections.

What is claimed is:

1. A telescopic mast (2) comprising a plurality of telescopic sections (4', 4", 4''') each with walls extending in the longitudinal direction of the mast (2), where the transverse dimension of the innermost telescopic section is smaller than the outermost telescopic section of two adjacent telescopic sections, so that the innermost telescopic section can slide longitudinally in and out of the outermost telescopic section of the two adjacent telescopic sections (4', 4", 4'''), wherein a restrictor (6) is provided between the two adjacent telescopic sections (4', 4", 4'''), the restrictor (6) comprising a longitudinally extending linear guide means (8) provided on one of the two adjacent telescopic sections and a clamping means (10) provided on the other one of the two adjacent telescopic sections, wherein the clamping means (10) is configured for providing a clamping force (12) to the guide means (8) during relative movement of said two adjacent telescopic sections (4', 4", 4'''), wherein the clamping force (12) includes two opposite directed rotation force components (14) in a plane normal to the longitudinal direction of the mast and perpendicular to a radius (16) of the mast (2), wherein the restrictor (6) comprises a control means (20), wherein the control means (20) is configured for controlling the clamping force (12), wherein the guide means (8) is a guide bar (24) and wherein the clamping means (10) comprise at least two sliding shoes (26), wherein the guide bar (24) has two longitudinally extending abutment surfaces (28) configured for receiving the clamping force (12), and wherein each sliding shoe (26) has a complimentary slide surface (30) adapted for transferring the clamping force (12) to a respective one of said abutment surfaces (28), wherein the clamping means (10) comprises a pivot arm (32), wherein the pivot arm (32) is pivotable about the radius (16) of the mast (2) through the guide means (8), and wherein a sliding shoe (26) of the at least two sliding shoes (26) is pivotably connected to the pivot arm (32) on each side of the guide bar (24).

2. A telescopic mast (2) according to claim 1, wherein the control means comprise a passive actuator for controlling the clamping force.

3. A telescopic mast (2) according to claim 2, wherein the control means (20) comprises a switching means (22), wherein the switching means (22) is configured for selectively clutching/declutching the clamping means (10).

4. A telescopic mast (2) according to claim 3, wherein the clamping means (10) comprises at least two pivot arms, wherein the control means (20) is an actuator (34), wherein the actuator (34) is in communication with the pivot arms (32), such that the pivot arms (32) rotate in opposite directions upon activation of the actuator (34).

5. A telescopic mast (2) according to claim 1, wherein the clamping means (10) is configured for providing a clamping force (12) to the guide means (8) with a centering force component (18) parallel with the direction of the radius (16) of the mast (2).

6. A telescopic mast (2) according to claim 5, wherein the clamping means (10) comprises at least two pivot arms (32), wherein the control means (20) is an actuator (34), and wherein the actuator (34) is in communication with the pivot arms (32), such that the pivot arms (32) rotate in opposite directions upon activation of the actuator (34).

7. A telescopic mast (2) according to claim 6, wherein the actuator (34) is a linear actuator, and that the actuator (34) is connected between the pivot arms (32).

8. A telescopic mast (2) according to claim 7, wherein the actuator (34) is a linear actuator, and the actuator (34) is connected between the pivot arms (32).

9. A telescopic mast (32) according to claim 1, wherein the clamping means (10) comprises at least two pivot arms (32).

10. A telescopic mast according to claim 1, wherein the control means comprise an active actuator for controlling the clamping force.

11. A telescopic mast according to claim 1, wherein the control means comprises a switching means, wherein the switching means is configured for selectively clutching/declutching the clamping means.

* * * * *